United States Patent
Kert et al.

(10) Patent No.: US 9,681,189 B2
(45) Date of Patent: Jun. 13, 2017

(54) PAIRED DEVICES

(71) Applicant: Microsoft Technology Licensing, LLC, Redmond, WA (US)

(72) Inventors: Kaido Kert, San Francisco, CA (US); Christopher James Foulds, Cambridgeshire (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/923,092

(22) Filed: Jun. 20, 2013

(65) Prior Publication Data

US 2014/0380362 A1 Dec. 25, 2014

(51) Int. Cl.
| | |
|---|---|
| *H04N 21/472* | (2011.01) |
| *H04N 21/41* | (2011.01) |
| *H04N 21/422* | (2011.01) |
| *H04N 21/4223* | (2011.01) |

(52) U.S. Cl.
CPC ....... *H04N 21/472* (2013.01); *H04N 21/4126* (2013.01); *H04N 21/4223* (2013.01); *H04N 21/42203* (2013.01)

(58) Field of Classification Search
CPC .......... H04N 21/472; H04N 21/42203; H04N 21/4223; H04N 21/4126; H04N 21/431; H04N 21/43615; H04N 21/436; H04N 21/43637; H04N 21/478; H04N 7/147; H04N 7/173
See application file for complete search history.

(56) References Cited

U.S. PATENT DOCUMENTS

| | | | |
|---|---|---|---|
| 8,250,147 B2 | 8/2012 | Ramanathan et al. | |
| 8,368,737 B2 | 2/2013 | Ravi et al. | |
| 8,416,273 B2* | 4/2013 | Chen et al. | 348/14.01 |
| 8,875,213 B2* | 10/2014 | Harris | H04N 21/4126 141/153 |
| 2003/0041332 A1* | 2/2003 | Allen et al. | 725/106 |
| 2004/0148632 A1* | 7/2004 | Park | H04N 5/44582 725/81 |

(Continued)

OTHER PUBLICATIONS

"Wi-Fi Certified Miracast™", Retrieved at: <<http://www.wi-fi.org/wi-fi-certified-miracast%E2T084%A2>>, Sep. 23, 2012, p. 1.

(Continued)

*Primary Examiner* — Pinkal R Chokshi (57) ABSTRACT

Disclosed herein is a media device. The media device comprises an output component configured to deliver an experience to a user. In addition, the media device comprises a pairing communication link for exchanging information about the experience with a paired user device, and a detection component configured to directly detect an indication received from the user device. The indication is received over an air interface other than the communication link. Further, the media device comprises a processing component for decoding the indication. It is configured to exchange information via the pairing communication link with the paired user device in response to decoding the indication, the information including information about an option. The processing component is further configured to detect selection of the option and modify operation of the media device to implement the selected option.

20 Claims, 4 Drawing Sheets

(56) References Cited

U.S. PATENT DOCUMENTS

| | | | |
|---|---|---|---|
| 2006/0130116 A1* | 6/2006 | Shi et al. | 725/134 |
| 2008/0137643 A1 | 6/2008 | Khanchandani et al. | |
| 2008/0141302 A1* | 6/2008 | Ota | G08C 17/00 |
| | | | 725/34 |
| 2008/0215333 A1* | 9/2008 | Tewfik et al. | 704/273 |
| 2009/0251526 A1 | 10/2009 | Book | |
| 2010/0064328 A1* | 3/2010 | Laasik | H04N 5/4403 |
| | | | 725/106 |
| 2011/0030021 A1* | 2/2011 | Campagna | H04N 7/181 |
| | | | 725/106 |
| 2011/0200304 A1 | 8/2011 | Rutledge | |
| 2011/0292299 A1* | 12/2011 | Lau | G06F 3/0346 |
| | | | 348/734 |
| 2012/0081502 A1* | 4/2012 | Naidu et al. | 348/14.04 |
| 2012/0260302 A1* | 10/2012 | Harris | H04N 21/4126 |
| | | | 725/133 |
| 2013/0152139 A1* | 6/2013 | Davis | H04N 21/482 |
| | | | 725/61 |
| 2014/0161414 A1* | 6/2014 | Gresham | H04N 5/76 |
| | | | 386/230 |
| 2014/0181886 A1* | 6/2014 | Goodman et al. | 725/133 |
| 2014/0223463 A1* | 8/2014 | Hatambeiki | H04N 21/44204 |
| | | | 725/12 |
| 2014/0280695 A1* | 9/2014 | Sharma | H04L 67/1095 |
| | | | 709/217 |

OTHER PUBLICATIONS

"BlackBerry Visor Mount Speakerphone VM-605", Retrieved at: <<http://docs.blackberry.com/en/smartphone_users/deliverables/8344/BlackBerry_Visor_Mount_Speakerphone_VM-605-1.0-US.pdf>>, Retrieved Date: Apr. 26, 2013, pp. 15.

Kim, Ryan, "Multi-Screen Mania: How Our Devices Work Together", Retrieved at: <<http://gigaom.com/2012/08/29/multi-screen-mania-how-our-devices-work-together/>>, Aug. 29, 2009, pp. 4.

Allen, Gary, "Companion Devices' are Only Part of Immersive Video Environment", Retrieved at: <<http://www.tvtechnology.com/multiscreen-views/0180/%E2%80%98companion-devices-are-only-part-of-immersive-video-environment-/217705>>, Feb. 12, 2013, pp. 3.

"International Search Report and Written Opinion", Application No. PCT/US2014/042599, Sep. 23, 2014, 8 Pages.

"International Preliminary Report on Patentability", Application No. PCT/US2014/042599, Oct. 2, 2015, 7 pages.

* cited by examiner

PAIRED DEVICES

BACKGROUND

Conventional communication systems allow the user of a device, such as a personal computer or mobile device, to conduct voice or video calls over a packet-based computer network such as the Internet. Such communication systems include voice or video over internet protocol (VoIP) systems. These systems are beneficial to the user as they are often of significantly lower cost than conventional fixed line or mobile cellular networks. This may particularly be the case for long-distance communication. To use a VoIP system, the user installs and executes client software on their device. The client software sets up the VoIP connections as well as providing other functions such as registration and authentication. In addition to voice communication, the client may also set up connections for other communication media such as instant messaging ("IM"), SMS messaging, file transfer and voicemail.

Recently, internet capabilities and functionality has been integrated into a television set (often referred to as a "Smart TV"), or into a set-top box arranged to be connected to a television set. This includes the integration of client software into a television set to enable communications over a packet-based computer network such as the Internet.

The embedding of a packet-based communication client in a TV has the advantage that a large screen is present, which can be utilised for video calling. Furthermore, significant processing power can be provided in the TV, particular as the power requirements for a large, mains electricity powered consumer electronics device are less stringent than, for example mobile devices. This enables a full range of features to be included in the embedded communication client, such as high quality voice and video encoding.

It is also known to integrate hardware devices into a Smart TV. For example, a microphone may be integrated into a smart TV which are capable of always listening to the environment of the Smart TV (for example a room of a house) to enable the Smart TV to react to voice commands.

SUMMARY

There is provided a media device. The media device comprises an output component configured to deliver an experience to a user. In addition, the media device comprises a pairing communication link for exchanging information about the experience with a paired user device, and a detection component configured to directly detect an indication received from the user device. The indication is received over an air interface other than the communication link. Further, the media device comprises a processing component for decoding the indication. It is configured to exchange information via the pairing communication link with the paired user device in response to decoding the indication, said information including information about an option. The processing component is further configured to detect selection of the option and modify operation of the media device to implement the selected option.

Also provided is a user device comprising a pairing communication link for exchanging information with a paired media device about an experience configured to be delivered at the media device. The user device also comprises an indication generator for generating an indication for transmission over an air interface other than the communication link, and a processing component configured to exchange information via the pairing communication link with the paired media device responsive to detection by the media device of the transmitted indication. The information includes information about an option, thereby enabling the media device to modify its operation upon detecting selection of the option.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

For a better understanding of the described embodiments and to show how the same may be put into effect, reference will now be made, by way of example, to the following drawings in which.

DETAILED DESCRIPTION

Embodiments will now be described by way of example only.

Disclosed herein is a media device (e.g. a TV) able to listen for known audio tones and/or look-out for known visual indicators (such as known QR codes) on one or more secondary (companion) user devices (e.g. smartphones), indicative of an event (e.g. an audible ringing indicative of a voice or video call), and to present options on how to interact with the event.

The media device has an output component configured to deliver an experience to a user. For instance, the media device may have an output component in the form of a large screen which is used to deliver a large-screen experience version of a communication client to the user. The media device is configured to establish automatic communication with a paired (companion) user device in response to detecting an indication.

The user device has an output component configured to deliver an experience to the user. For instance, the user device may deliver an alternative experience version of the communication client to the user. The user device client and the media device client may be linked, with the user device client offering a "companion app" style experience.

Figure 1:
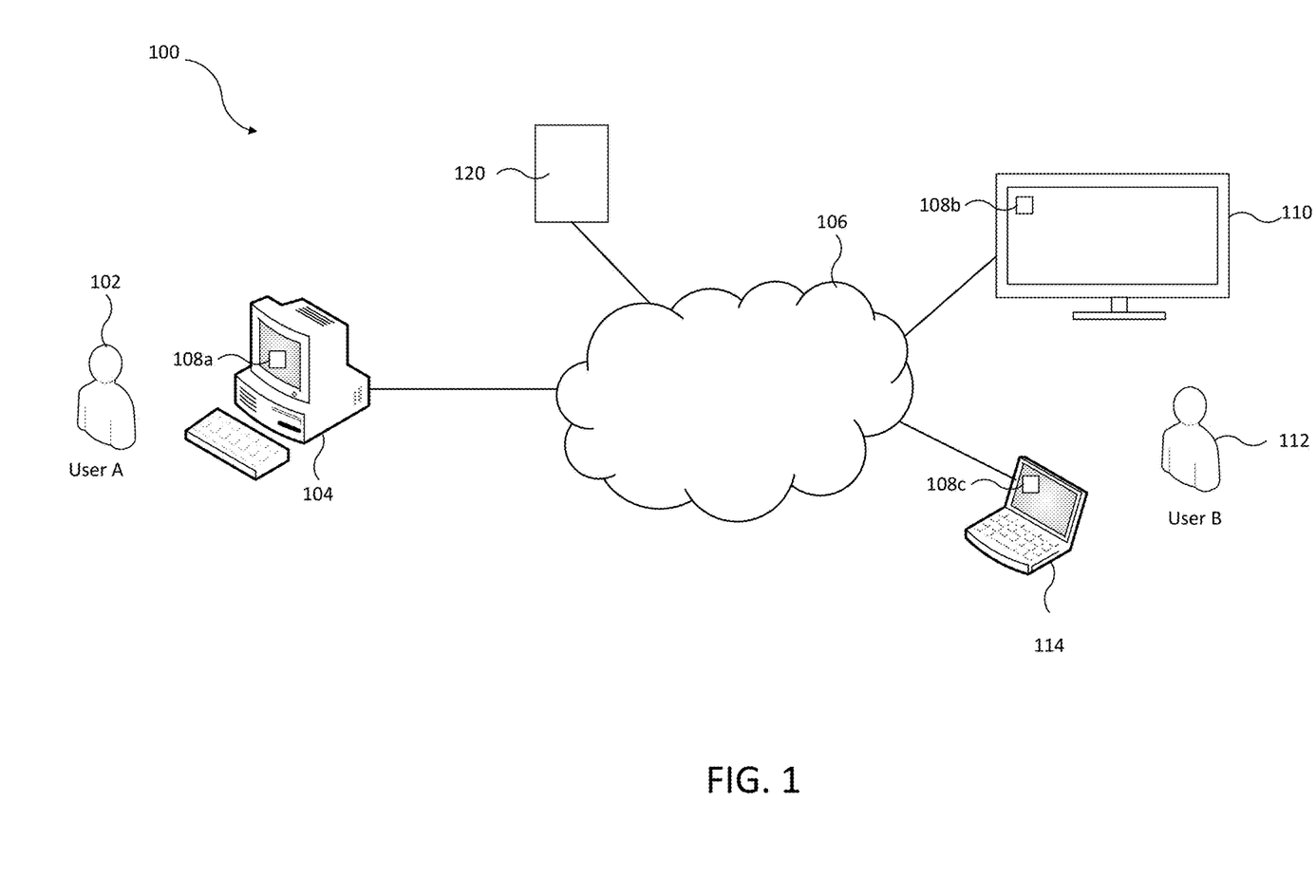
FIG. 1 shows a schematic illustration of a communication system.

FIG. 1 shows a communication system 100 comprising a second user 102 ("User A") who is associated with a second user device 104 and a first user 112 ("User B") who is in the vicinity of a media device 110, which is a television ("TV") in this embodiment.

It is common place for there to be one or more other devices in the same environment as a TV. These other devices are referred to herein as "companion devices" for reasons which will be described in more detail below. For example in a living room companion devices such as smart phones and laptop computers may also be present. FIG. 1 illustrates such an example of a companion device as a laptop computer 114. Whilst FIG. 1 shows a single companion user device 114 in addition to the TV 110, it will be appreciated that a plurality of companion devices may be present in the vicinity of the TV 110.

The user device 104 can communicate over a network 106 in the communication system 100 with the companion user device 114 or the TV 110, thereby allowing the users 102 and 112 to communicate with each other over the network 106.

The communication system 100 shown in FIG. 1 is a packet-based communication system, but other types of communication system could be used. The network 106 may, for example, be the Internet. Each of the user devices 104 and 114 may be, for example, a mobile phone, a tablet, a laptop, a personal computer ("PC") (including, for example, Windows™, Mac OS™ and Linux™ PCs), a gaming device, a personal digital assistant ("PDA") or other embedded device able to connect to the network 106. The user devices 104 and companion device 114 are arranged to receive information from and output information to the user of the respective device. The user devices 104 and companion device 114 comprise output means such as a display and speakers. The user device 104 and companion device 114 also comprise input means such as a keypad, a touch-screen, mouse, a microphone for receiving audio signals and/or a camera for capturing images of a video signal. The user devices 104 and the companion device 114 are connected to the network 106. For a touch-screen, the user may input commands by way of swiped or gestures.

Note that in alternative embodiments, the user device 104 and companion device 114 can connect to the network 106 via additional intermediate networks not shown in FIG. 1. For example, if the user device 104 is a mobile device, then it can connect to the network 106 via a cellular mobile network, not shown in FIG. 1.

The user device 104, companion device 114, and the TV 110 each execute an instance of a communication client 108, provided by a software provider associated with the communication system 100. The communication client is a software program executed on a local processor in the respective device. The client performs the processing required at the device in order for the device to transmit and receive data over the communication system 100.

Communication system 100 also comprises a back-end server 120 associated with a service provider (e.g. an operator of network 106). Both device 114 and TV 110 are operable to communicate with back-end server 120 over network 106. Although shown as a single server, it will be appreciated that the functionality of server 120 may be divided between any number of suitable computing devices.

Each communication client 108a, 108b, 108c has a log in/registration facility which associates the user device 104, TV 110 and companion device with a particular respective user. Users can have communication client instances running on other devices associated with the same log in/registration details.

In the case where the same user, having a particular username, can be simultaneously logged in to multiple instances of the same client application on different terminals, back-end server 120 of communication network 106 is arranged to map the username (user ID) to all of those multiple instances but also to map a separate sub-identifier (sub-ID) to each particular individual instance. Thus the communication system is capable of distinguishing between the different instances whilst still maintaining a consistent identity for the user within the communication system.

User 102 is logged-in at device 104 as "User A". User 112 is logged-in at device 114 as "User B" and at TV 110 as "User B". The TV 110 can be logged in as multiple identities, with one of those identities matching that of device 114 (i.e. "User B").

The TV 110 is connected to the network 106 via a network interface such as a modem. The TV 110 shown in FIG. 1 is a standalone unit, but it should be appreciated that a separate TV and set-top box (STB) or other TV-connected device can also be used.

The TV 110 is executing an embedded communication client 108b (client engine). Note that in alternative embodiments, the embedded communication client can be executed in a STB. The embedded communication client 108b comprises software executed on a local processor in the TV 110.

The TV 110 is arranged to receive information from and output information to the user 112. A remote control unit may act as an input device operated by the user 112 for the control of the TV 110. The TV 110 can also receive broadcast television signals, and display these as video (television programmes) to the user on the TV screen. The broadcast television signals can be delivered by terrestrial, satellite or cable broadcasting, and be in the form of analogue signals or digital data.

Figure 2:
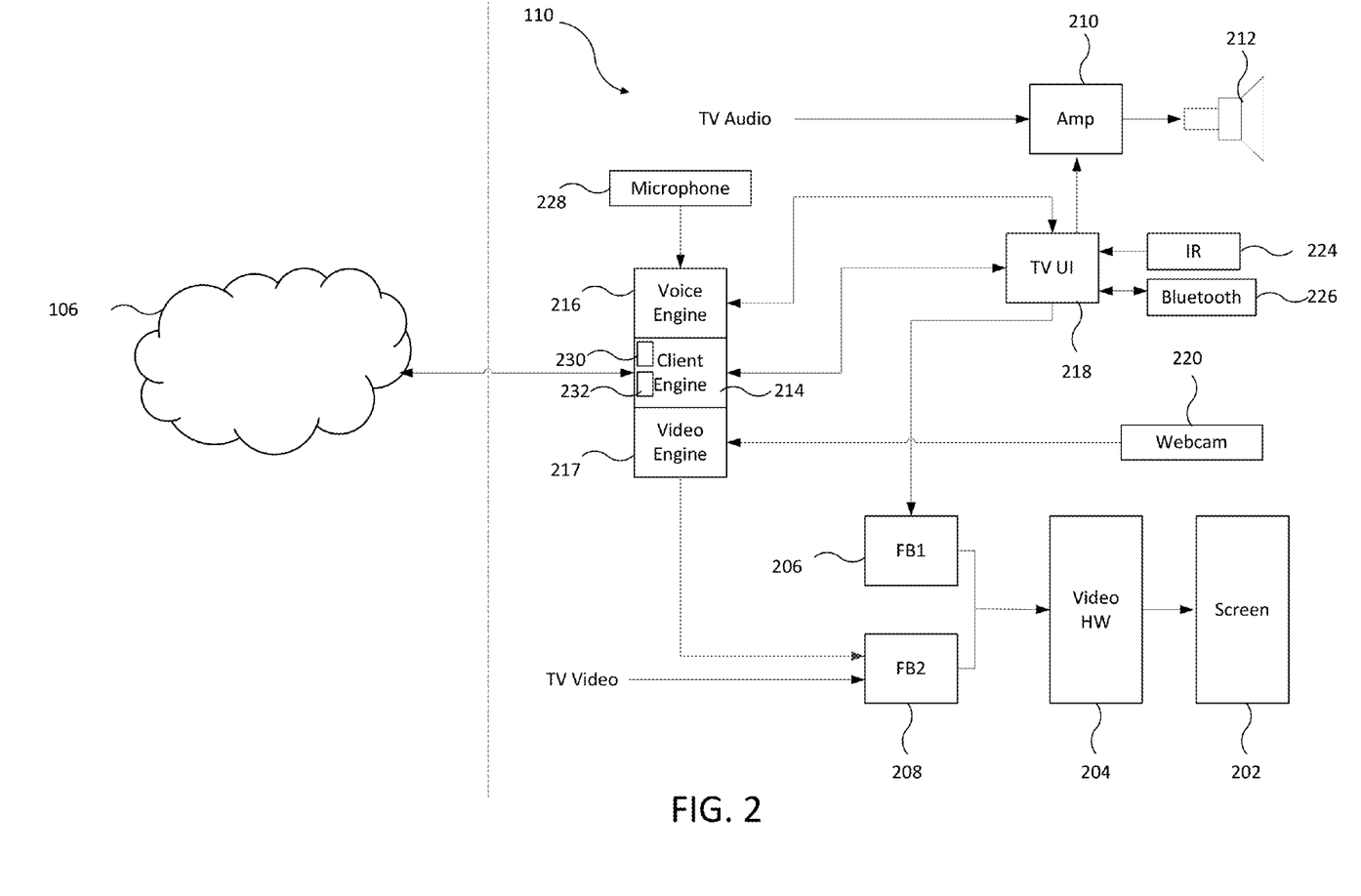
FIG. 2 is a schematic block diagram of a media device.

Reference is now made to FIG. 2, which illustrates the hardware and software functional blocks embedded in the TV 110. The TV 110 comprises a number of output components including a screen 202 and at least one speaker 212. The screen 202 is for displaying images to the user 112 and is driven by video driver hardware 204 arranged to convert video signals into the form required to be correctly displayed on the screen 202. The video driver hardware 204 is provided with digital video data from two frame buffers 206 and 208. The frame buffers 206 and 208 are storage devices that buffer video data that is to be displayed to the user. Frame buffer 2 ("FB2") 208 receives standard TV video signals, as is known for the display of broadcast TV. Frame buffer 1 ("FB1") 206 stores video data related to the packet-based communication client, as will be described presently. An audio amplifier 210 receives TV audio signals and amplifies these for output through at least one speaker 212.

The TV audio and video input signals themselves originate from television signals broadcast via any suitable means such as a satellite repeater stations, wireless terrestrial repeater stations or cable; and received by a television receiver unit of the TV 100 (not shown). Note that broadcasting is distinct from point-to-point communication, including being distinct from multicasting (i.e. point-to-multipoint). In broadcasting, signals are transmitted indiscriminately, i.e. regardless of whether the user has selected to receive the signal (although a decryption key or such like may still be required so that only authorised users can access the broadcast); whereas in point-to-point communication, signals must be requested by the user or users receiving them. Or put another way, to receive a broadcast a user simply "tunes in" without needing to send any signal to the broadcaster, whereas to establish a point-to-point connection then signals must be exchanged between the user and broadcaster.

The TV receiver unit may comprise for example an antenna, satellite dish or cable input; sampling circuitry; a filter; a low noise amplifier; a mixer, and/or an analogue to digital converter. After being received by the receiver unit, the signals are then processed by a signal processing apparatus (also not shown) before being input to the frame buffers and amplifiers of FIG. 1. Such signal processing is well known to persons skilled in the art and is therefore not discussed in detail herein.

The packet-based communication client embedded in the TV 110 is based around four main elements. These four elements are shown as software elements that are stored in a memory and executed on a processor, although alternatives are envisaged. The four elements are: a client engine 214; an audio engine 216; a video engine 217; and a TV user interface 218.

The client engine 214 is responsible for setting up connections to the packet-based communication system. This is performed via a connection from the TV 110 to the network 106. The TV 110 is connected to the network 106 via a network interface 122 such as a modem, and the connection between the TV 110 and the network interface may be via a cable (wired) connection or a wireless connection. The client engine 214 performs call set-up, authentication, encryption and connection management, as well as other functions relating to the packet-based communication system such as firewall traversal, presence state updating, and contact list management.

The audio engine 216 is responsible for the encoding of voice signals input to the TV 100 via a microphone 228 as VoIP packets for transmission over the network 106 and the decoding of VoIP packets received from the network 106 for presentation as audio information to the user 112 of the TV 110. The microphone 228 may be integrated into the TV 110 or be connected to the TV 110 by way of a wired or wireless connection.

The video engine 217 is responsible for the encoding of video signals input to the TV (e.g. from a webcam 220 or other video camera) as video packets for transmission over the network 106 in a video call, and the decoding of video packets received from the network 106 in a video call for presentation as video images to the user 112 of the TV 110. The webcam 220 may be integrated into the TV 110 or be connected to the TV 110 by way of a wired or wireless connection.

The TV user interface ("UI") 218 is responsible for presenting visual information to the user 112 of the TV 110 in the form of a graphical user interface displayed on the TV screen 202.

The client engine 214 is connected to the TV UI 218 in order to control what the UI displays to the user. The client engine 214 is also closely integrated with the audio engine 216 and video engine 217 for the efficient transmission and receiving of voice and video packets over the network 106.

The video engine 217 is connected to FB2 208 for providing video data to be displayed on the TV screen 202.

The TV UI 218 is connected to FB1 206, so that the graphical user interface data is buffered and ultimately displayed to the user on the screen 202. The TV UI 218 is also connected to the amplifier 210, enabling sound (such as voice signals or notifications) to be produced from the TV speakers 212. The TV UI 218 may also be connected to an infra-red ("IR") receiver 224 and/or a Bluetooth transceiver 126 which are used for communicating with a remote control unit.

Note that if the embedded communication client is provided in a STB (or other TV-connected device) for connection to a TV, then the system in FIG. 1 differs only in that the screen 202, amplifier 210, speaker 212, webcam 220 and microphone 228 blocks are located in the TV itself, whereas the remaining functional blocks are located in the set top box, which is connected to the TV.

Client engine 214 comprises an audio monitoring application 230, which receives inputs from microphone 228, and a video monitoring application 232, which receives inputs from camera 220. Monitoring applications 230, 232 are operable to analyse their respective inputs.

The TV 110 is configured so at to continuously listen to its environment. That is, TV 110 is configured so as to repeatedly capture audio signals using microphone 228 which are input to audio monitoring application 230 for analysis.

The TV 110 is also configured so as to continuously watch its environment. That is, TV 110 is configured so as to repeatedly capture video signals using camera 220 which are input to video monitoring application 232 for analysis.

Figure 3:
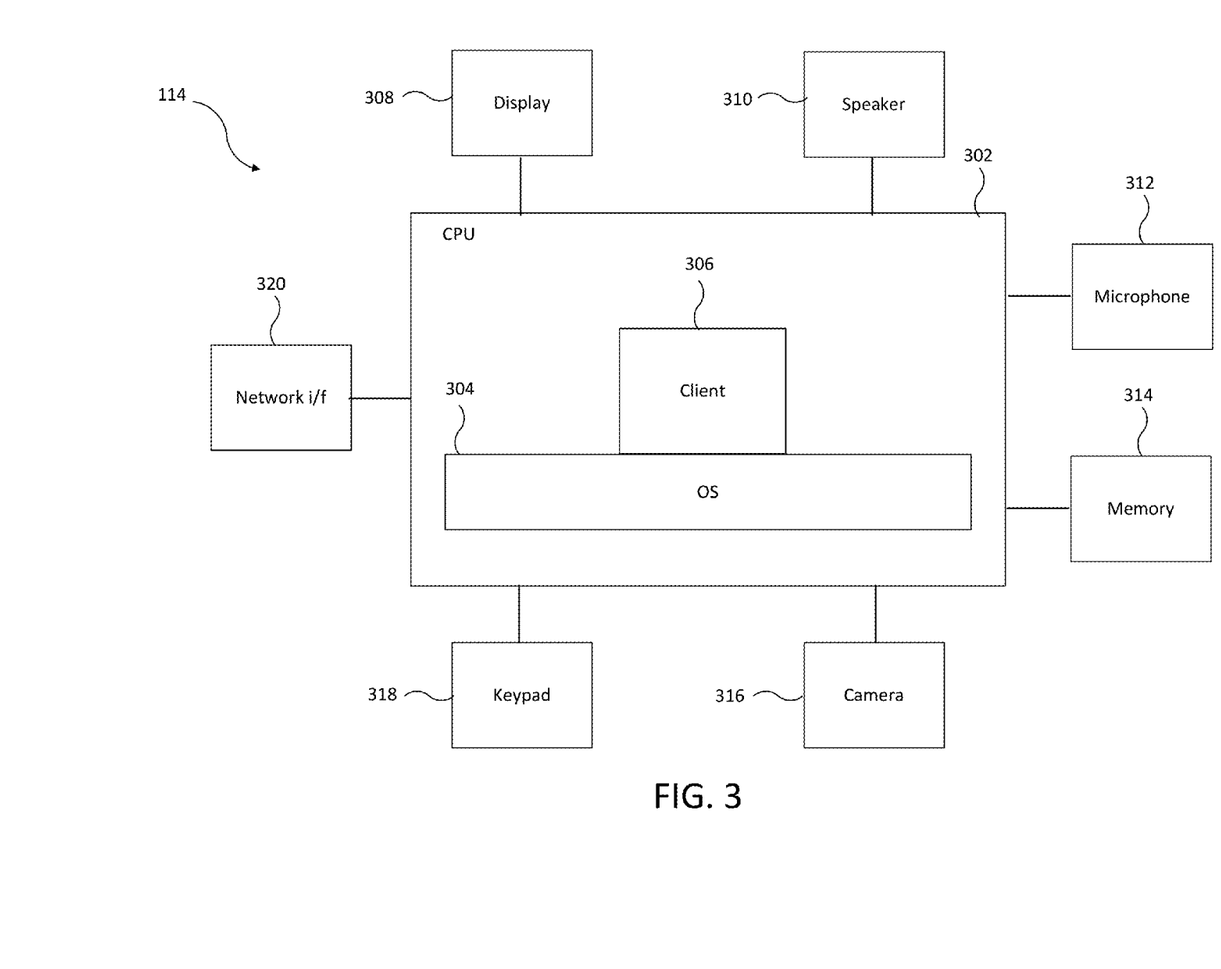
FIG. 3 is a schematic block diagram of a user device.

FIG. 3 illustrates a detailed view of the user device 114 on which is executed a communication client instance 306 for communicating over the communication system 100. The user device 114 comprises a central processing unit ("CPU") or "processing module" 302, to which is connected: output devices such as a display 308, which may be implemented as a touch-screen, and a speaker (or "loudspeaker") 310 for outputting audio signals; input devices such as a microphone 312 for receiving audio signals, a camera 316 for receiving image data, and a keypad 318; a memory 314 for storing data; and a network interface 320 such as a modem for communication with the network 106. The user device 114 may comprise other elements than those shown in FIG. 3. The display 308, speaker 310, microphone 312, memory 314, camera 316, keypad 318 and network interface 320 may be integrated into the user device 104 as shown in FIG. 3. In alternative user devices one or more of the display 308, speaker 310, microphone 312, memory 314, camera 316, keypad 318 and network interface 320 may not be integrated into the user device 114 and may be connected to the CPU 302 via respective interfaces. One example of such an interface is a USB interface. If the connection of the user device 114 to the network 106 via the network interface 320 is a wireless connection then the network interface 320 may include an antenna for wirelessly transmitting signals to the network 106 and wirelessly receiving signals from the network 106.

FIG. 3 also illustrates an operating system ("OS") 304 executed on the CPU 302. Running on top of the OS 304 is the software of the client instance 306 of the communication system 100. The operating system 304 manages the hardware resources of the computer and handles data being transmitted to and from the network 106 via the network interface 320. The client 306 communicates with the operating system 304 and manages the connections over the communication system. The client 306 has a client user interface which is used to present information to the user 112 and to receive information from the user 112. In this way, the client 306 performs the processing required to allow the user 112 to communicate over the communication system 100.

The device 114 and TV 110 have an established pairing relationship. That is, device 114 and TV 110 are capable of wireless communication with one another (e.g. Bluetooth communication) and, at some stage, an initial pairing procedure has been completed in order to establish a relationship therebetween. For instance, as part of a user-initiated Bluetooth pairing procedure, a shared secret is typically created in order to establish the relationship and may be stored at both TV 110 and device 114 using techniques known in the art. Thereafter, device 114 and TV 110 can identify themselves to one another, and create a secure link, using the shared secret whenever they are visible to one another (i.e. whenever device 114 is in range of TV 110). The device 114 and TV 110 remain paired for as long as both retain the shared secret, even when out of range of one another.

The device 114 and TV 110 also have an established presence relationship. That is, device 114 is in range of, and is thus visible to, TV 114 such that a link can be established based on the pairing as described above.

Thus, device 114 is able to act as a companion device to TV 110. That is, client application 108c executed at device 114 is able to interact with embedded client application 108b via a pairing communication link for exchanging information between TV 110 device 114, which is established by way of the pre-existing presence and pairing relationships. This is described in more detail below with reference to FIG. 4.

Although described above with reference to Bluetooth, it will be appreciated that companion device 114 may be paired with the TV 110 in a number of different ways, using both wireless and wired connection protocols. For example, the companion device 114 may be communicatively coupled with the TV 110 via a WiFi connection, Ethernet connection or other type of data connection, and a suitable pairing relationship may be established for any of these.

For instance, the pre-existing presence and pairing relationship may arise from the fact that both device 114 and TV 110 are logged in as "User B". In this instance, a pairing communication link may be established over network 106 via back-end 120 server using techniques which are known in the art (rather than directly between device 114 and TV 110 over, e.g., an air interface).

Figure 4:
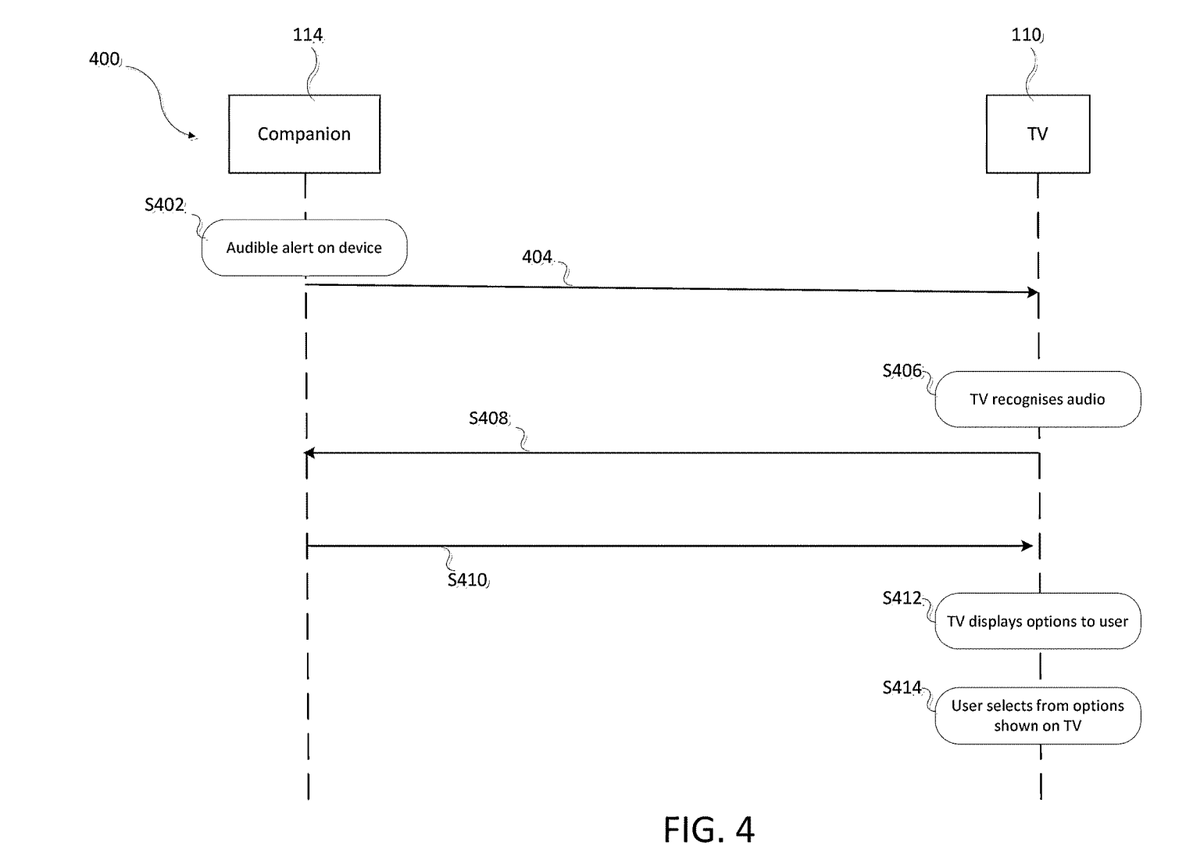
FIG. 4 is a schematic block diagram of a method.

A method 400 will now be described with reference to FIG. 4.

As discussed, both TV 110 and device 114 are configured to deliver experiences to user 112 via one or more output components. The pairing communication link is used for exchanging information about experiences with device 114.

At step S402, an event triggers the companion device 114 to output an indication 404 of the event over an air interface other than the communication link. The event may, for example be a communication event such as an incoming voice or video call received at the companion device 114 from user device 104. The indication may be in the form of an audio indication (alert) played out via speaker 310 and/or a visual indication displayed via display 308.

The indication is detectable by, and recognizable to, TV 110 such that TV 110 is able to determine that the event has occurred by detecting and decoding the indication.

In embodiments where the indication 404 is an audio alert, at step S406, the audio alert is captured by TV 110 (which, as discussed, is constantly listening to its environment) as an audio signal which is input to, and analysed by, audio monitoring application 230.

The audio alert is recognizable to TV 110, which may be achieved in a variety of ways. For instance, a simple way of achieving this is for a particular event to trigger one of a number of predetermined audible alerts, each having a distinct audio waveform about which information is stored at the TV 110. That is, for the audio alert to comprise a recognizable audio sequence. The audio monitoring application 230 then decodes the audio alert by analysing the captured audio using (e.g.) Fourier analysis and is thus able to recognize the waveform (and therefore the event).

Alternatively, information about the event may be encoded as an inaudible (sonic) watermark. For a particular type of event, the information may indicate the type of the event. For instance, for an incoming call, the information may indicate that the event is an incoming call. Techniques for encoding and decoding information in the form of inaudible watermarks are known in the art.

The inaudible watermark is then captured by microphone 312 of TV 110 and decoded by audio monitoring application 230, thereby allowing the TV 110 to identify the event based on the decoded information.

This allows user 112 to select (e.g.) a customized ringtone (i.e. which need not be recognizable to TV 110 per se) to be played out on receipt of a call. Before playing out the ringtone as an audio stream in response to an incoming call, client 306 injects encoded information pertaining to the incoming call in the form of an inaudible watermark into the audio stream. Thus, the audio alert played out though speaker 312 has both an audible component which serves to inform the user of the incoming call and an inaudible component which serves to inform TV 110 of the incoming call.

At step S406, audio monitoring application 230 directly detects the indication and determines that the event has occurred by decoding the indication. In response thereto, TV 110 sends a notification to device 114 that it has identified the event (step S408), via a pairing communication link established by way of the pre-existing presence and pairing relationships i.e. a notification that it has decoded the indication and is capable of offering an experience.

At step S410, device 114 provides TV 110 with a list of selectable options for handling the event, again via the pairing communication link, which TV 110 displays to the user at step S412 via screen 202. At step S414, user 112 selects from the displayed options, and the operation of the TV 110 is modified to implement the selected option.

Additionally or alternatively, selectable options for handling the event are displayed on display 308 of companion device 114 and selected using input means of device 114. Responsive thereto, device 114 transmits a control signal to TV 110 causing TV 110 to implement the option.

In both cases, information about the option is exchanged over the pairing communication link.

The TV may be further configured to transmit a control signal to device 114 causing device 114 to modify its operation.

For example, if the event is a communication event received at the companion device 114 (such as a voice or video call) from a remote calling user (such as user 102), one of the options displayed on the TV 110 and/or device 114 may be to transfer the call to the TV 110 instead (i.e. to answer, or continue, the call at the TV rather than on the device 114). Once the user selects the option to transfer the call, the TV sends a control signal to initiate transfer of the communication event from device 114 to TV 110. TV 110 has a network address which is also sent to device 114. Device 114 then sends a message to the calling user comprising the network address of TV 110 so that a network connection can be established between the calling user and the TV 110, thereby allowing the call to be transferred to the TV.

As discussed, in embodiments, the pairing communication link is established via back-end server 120, in which case information (such as notifications, selected options, selectable options etc.) is sent over network 106 via back-end server 120.

The call may be transferred to TV 110 before it is established (e.g. during a "ringing" period) and then established at TV 110. Alternatively, the call may be first established at device 114 and then transferred later (i.e. during the call).

In alternative embodiments, an event may trigger a visual indication such as a Quick Response (QR) code to be displayed on display 308 of device 114, instead of or in addition to an audio alert. Providing the display 308 is visible to camera 220, the TV 110 will capture image data of the visual indication (as discussed, TV 110 is constantly watching its environment). For instance, in embodiments where device 114 is a smart phone, user 112 can direct the display 308 towards camera 220. Video monitoring application 232 then analyses the captured image data, detects the visual indication, and determines that the event has occurred. Thereafter, the method proceeds as described above (from S408 onwards).

Generally, any of the functions described herein (e.g. the functional modules shown in FIGS. 2 and 3, and the functional steps shown in FIG. 4) can be implemented using software, firmware, hardware (e.g., fixed logic circuitry), or a combination of these implementations. The modules and steps shown separately in FIGS. 2 and 3 may or may not be implemented as separate modules or steps. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors. For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. In particular, whist the embodiments described above have been described with reference to a TV with an embedded communication client, it should be understood that the client can also be embedded into another type of media device for connection to a TV, such as a set top box, a games console or video playback device (e.g. a video disc player or a personal video recorder).

Further, whilst the embodiments described above have been described with references to particular experiences delivered by a communication client, it will be appreciated that typical user device are operable to execute versions of many different applications or "apps", each of which can deliver a particular experience appropriate to that device. Similarly, typical media devices are also operable to execute (potentially different) versions of those applications or "apps" which offer alternative experiences. It will be appreciated that the claimed subject matter is broadly applicable to all such experiences.

The invention claimed is:

1. A media device comprising:
an interface to an output device;
a transmitter and a receiver configured to facilitate a pairing communication link between the media device and a user device;
a detection component implemented, at least in part, in hardware, and configured to directly detect an indication received from the user device over an air interface other than the pairing communication link, the indication including one or more of an audio indication or a visual indication; and
a processor configured to enable the media device to:
execute a first communication client associated with a username and logged in with the username;
pair with the user device using the pairing communication link to provide communications between the first communication client and a second communication client on the user device via the pairing communication link, the second communication client associated with the username and logged in with the username, the media device configured to pair with the user device based, at least in part, on the first communication client and the second communication client being associated with the username;
decode the detected indication received via the detection component and from the paired user device, the detected indication associated with a communication event associated with the second communication client;
output data associated with the detected indication using the interface to the output device;
exchange, via the pairing communication link, information from the first communication client to the second communication client associated with the paired user device in response to decoding the indication, the information including information about an option;
detect selection of the option; and
modify operation of the media device to implement the selected option.

2. The media device according to claim 1, the processor further configured to enable the media device to transmit to the paired user device, as part of said information, a notification that the indication has been decoded.

3. The media device according to claim 1, whereby the option is a selectable option received as part of said information and output to the user using the interface to the output device, the processor further configured to enable the media device to detect selection, at the media device, of the option by the first user.

4. The media device according to claim 1, the processor further configured to enable the media device to detect selection of the option by detecting a control signal transmitted as part of said information by the paired user device in response to the option being selected at the paired user device.

5. The media device according to claim 1, wherein the interface to the output device comprises an interface to a display for displaying information to the first user in a user interface.

6. The media device according to claim 1, wherein the detection component comprises a microphone for detecting the audio indication.

7. The media device according to claim 6, wherein the audio indication comprises a sonic watermark.

8. The media device according to claim 6, wherein the audio indication comprises an audio sequence recognisable by the detection component.

9. The media device according to claim 1, wherein the detection component comprises a camera for detecting the visual indication.

10. The media device according to claim 1, wherein the processor is further configured to enable the media device to transmit a control signal to the paired user device associated with modifying operation of the paired user device.

11. The media device according to claim 10, wherein the processor is further configured to:
send information to the paired user device, said information enabling the communication event to be established between the media device and a second user device.

12. The media device according to claim 11, wherein said information comprises a network address of the media device for establishing the communication event with the second user device.

13. The media device according to claim 11, wherein the processor is configured to enable the media device to receive an established communication event associated with the second communication client that is transferred from the paired user device.

14. A user device comprising:
a transmitter and a receiver configured to facilitate a pairing communication link with a media device;
an indication generator implemented, at least in part, for generating an indication for transmission, over an air interface other than the pairing communication link, to the media device, the indication including one or more of an audio indication or a visual indication; and
a processor configured to enable the user device to:
execute a first communication client, from a software provider and associated with a username, the first communication client logged in with the username and configured to trigger generating the indication for transmission, over the air interface other than the pairing communication link, to the media device;
pair with the media device using the pairing communication link to provide communications between the first communication client and a second communication client, from the software provider and on the media device, the second communication client associated with the username and logged in with the username, the user device configured to pair with the media device based, at least in part, on the first communication client and the second communication client being associated with the username; and
exchange information, via the pairing communication link, with the paired media device responsive to detection by the media device of the indication transmitted over the air interface, the information including information about an option associated with a communication event associated with the first communication client, thereby enabling the paired media device to modify its operation upon detecting selection of the option.

15. The user device according to claim 14, wherein the processor is further configured to:
provide the option as a selectable option to the paired media device as part of said information;
receive a control signal from the paired media device when the selectable option has been activated by a user of the paired media device; and
modify the operation of the user device based on the control signal.

16. The user device according to claim 14, further comprising an output device, wherein the option is output to the user via the output device, and
wherein the processor is further configured to:
detect selection of the option by the user; and
responsive to detecting selection of the option, transmit a control signal to the paired media device as part of said information.

17. The user device according to claim 14, further comprising an output display device.

18. The user device according to claim 14, wherein the communication client is further configured to establish a communication event with a second user device via a network that is different from the pairing communication link.

19. The user device according to claim 18, wherein the processor is further configured to transfer the communication event established via the first communication client to the paired media device based on the control signal.

20. A method comprising:
pairing a media device with a user device via a pairing communication link, the media device comprising a first communication client associated with a username and logged in with the username, the user device comprising a second communication client associated with the username and logged in with the username, the pairing comprising pairing with the user device based, at least in part, on the first communication client and the second communication client being associated with the username;
directly detecting, at the media device, an indication received from the paired user device over an air interface other than the pairing communication link, the indication from the paired user device associated with a communication session with a second user device over a communication network link that is different from the pairing communication link, the indication including one or more of an audio indication or a visual indication;
decoding the indication and exchanging information via the pairing communication link with the paired user device;
receiving a selectable option over the pairing communication link and outputting a selectable option to a user at the media device; and
detecting selection of the option and sending information to the paired user device, the information enabling an established communication event with a second communication device to be transferred to the media device from the paired user device, based on the selected option.

* * * * *